United States Patent
Cronin

(10) Patent No.: US 9,635,506 B1
(45) Date of Patent: Apr. 25, 2017

(54) ZONE BASED WIRELESS PLAYER COMMUNICATIONS

(71) Applicant: ProSports Technologies, LLC, Miami, FL (US)

(72) Inventor: John Cronin, Bonita Springs, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/732,400

(22) Filed: Jun. 5, 2015

Related U.S. Application Data

(60) Provisional application No. 62/008,492, filed on Jun. 5, 2014.

(51) Int. Cl.
*H04W 4/02* (2009.01)

(52) U.S. Cl.
CPC .................. *H04W 4/023* (2013.01)

(58) Field of Classification Search
CPC .................................... H04W 4/023
USPC .................................... 455/456.3
See application file for complete search history.

(56) References Cited

U.S. PATENT DOCUMENTS

| | | | |
|---|---|---|---|
| 5,754,636 A | 5/1998 | Bayless et al. | |
| 6,824,480 B2 | 11/2004 | John et al. | |
| 7,583,901 B2 | 9/2009 | Nakagawa et al. | |
| 7,715,723 B2 | 5/2010 | Kagawa et al. | |
| 7,899,159 B1 | 3/2011 | Croak et al. | |
| 8,027,451 B2 | 9/2011 | Arendsen et al. | |
| 8,175,913 B2 | 5/2012 | Checketts et al. | |
| 8,188,878 B2 | 5/2012 | Pederson et al. | |
| 8,540,583 B2 | 9/2013 | Leech | |
| 8,565,607 B2 | 10/2013 | Kang et al. | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |

(Continued)

FOREIGN PATENT DOCUMENTS

| | | |
|---|---|---|
| CN | 1741548 | 3/2006 |
| CN | 101815100 | 8/2010 |

(Continued)

OTHER PUBLICATIONS

PCT Application No. PCT/US2015/043882 International Search Report and Written Opinion mailed Oct. 28, 2015.

(Continued)

*Primary Examiner* — Chuong A Ngo
(74) *Attorney, Agent, or Firm* — Polsinelli LLP

(57) ABSTRACT

Embodiments of the present invention include a wireless coach-to-player communications system based on specific locales of players on the field. A combination of location based services and wireless access points and hubs tasked with communicating with particular players or particular zones where players are present (as determined through the use of location based services) is implemented as a part of the communications system. As a result of dedicating communication from certain access points and hubs to certain players or zones, coaches may communicate openly with some or all of their players in a particular region of the field. The system may also be used for targeted communications with fans and spectators attending a sporting event.

20 Claims, 3 Drawing Sheets

(56) References Cited

U.S. PATENT DOCUMENTS

| | | |
|---|---|---|
| 8,660,501 B2 | 2/2014 | Sanguinetti |
| 8,687,965 B2 | 4/2014 | Pederson et al. |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 2007/0022445 A1 | 1/2007 | Areseneau |
| 2007/0140176 A1 | 6/2007 | Bachenberg |
| 2009/0036205 A1* | 2/2009 | Seacat .................. A63B 69/002 463/30 |
| 2009/0310971 A1 | 12/2009 | Kim et al. |
| 2010/0082980 A1 | 4/2010 | Shiraki |
| 2010/0283630 A1 | 11/2010 | Alonso |
| 2010/0289644 A1* | 11/2010 | Slavin ................ G08B 13/2402 340/568.1 |
| 2011/0055862 A1 | 3/2011 | Harp et al. |
| 2011/0294547 A1 | 12/2011 | Ni |
| 2011/0306326 A1 | 12/2011 | Reed et al. |
| 2012/0078667 A1 | 3/2012 | Denker et al. |
| 2012/0158995 A1 | 6/2012 | McNamee et al. |
| 2012/0314797 A1 | 12/2012 | Kummetz et al. |
| 2013/0126713 A1 | 5/2013 | Haas et al. |
| 2013/0141555 A1 | 6/2013 | Ganick et al. |
| 2013/0208184 A1 | 8/2013 | Castor et al. |
| 2013/0217332 A1 | 8/2013 | Altman et al. |
| 2013/0279917 A1 | 10/2013 | Son et al. |
| 2013/0303192 A1 | 11/2013 | Louboutin |
| 2013/0317835 A1 | 11/2013 | Mathew |
| 2013/0317916 A1 | 11/2013 | Gopalakrishnan et al. |
| 2013/0328917 A1 | 12/2013 | Zambetti et al. |
| 2013/0330088 A1 | 12/2013 | Oshima et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0336222 A1 | 12/2013 | Lu et al. |
| 2013/0336662 A1 | 12/2013 | Murayama et al. |
| 2013/0337787 A1 | 12/2013 | Yamada et al. |
| 2013/0343762 A1 | 12/2013 | Murayama et al. |
| 2014/0037296 A1 | 2/2014 | Yamada et al. |
| 2014/0062773 A1 | 3/2014 | MacGougan |
| 2014/0065962 A1 | 3/2014 | Le |
| 2014/0071221 A1 | 3/2014 | Dave |
| 2014/0098241 A1 | 4/2014 | Stout et al. |
| 2014/0105084 A1 | 4/2014 | Chhabra |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0173692 A1 | 6/2014 | Srinivasan |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0256478 A1 | 9/2014 | Gale |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0357226 A1* | 12/2014 | Charugundla ........ H04W 4/023 455/411 |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0011242 A1 | 1/2015 | Nagaraj |
| 2015/0026623 A1 | 1/2015 | Horne |
| 2015/0031397 A1 | 1/2015 | Jouaux |
| 2016/0057610 A1 | 2/2016 | Cronin |

FOREIGN PATENT DOCUMENTS

| | | |
|---|---|---|
| CN | 102273323 | 12/2011 |
| CN | 102843186 | 12/2012 |
| CN | 202857947 | 4/2013 |
| CN | 103297888 | 9/2013 |
| CN | 103490812 | 1/2014 |
| EP | 2 549 442 | 1/2013 |
| KR | 10 2013-0116417 | 10/2013 |
| WO | WO 2009/104921 | 8/2009 |
| WO | WO 2013/070271 | 5/2013 |
| WO | WO 2013/109934 | 7/2013 |
| WO | WO 2014/085694 | 6/2014 |
| WO | PCT/US15/43882 | 8/2015 |

OTHER PUBLICATIONS

U.S. Appl. No. 14/819,386 Office Action mailed Sep. 24, 2015.
About ByteLight, Date of Download: Jul. 18, 2014, www.bytelight.com/about.
"Create Innovative Services with Play APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Dawson, Keith; "LiFi in the Real World" All LED Lighting—Illuminating The Led Community, Jul. 31, 2013.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Hao et al., Tian; "COBRA: Color Barcode Streaming for Smartphone Systems", MobiSys '12 Proceedings of the 10th International conference on Mobile systems, applications, and Services. pp. 85-98, Jun. 25, 2012.
Haruyama, Shinichiro; "Visible Light Communications: Recent Activities in Japan", Smart Spaces: A Smart Lighting ERC Industry—Academia Day at BU Photonics Center, Boston University. Feb. 8, 2011.
Komine, Toshihiko; Nakagawa, Masao; "Integrated System of White LED Visible-Light Communication Power-Line Communication", Dept. of Information and Computer Science, Keio University. Feb. 2003.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.

(56) References Cited

OTHER PUBLICATIONS

Little, Thomas; "Exploding Interest in Visible Light Communications: An Applications Viewpoint", Smart Light Annual Industry-Academia Days, Feb. 13-15, 2012.

Montero, Eric, "Design and Implementation of Color-Shift Keying for Visible Light Communications", Sep. 2013, McMaster University.

Nguyen et al., "A Novel like switching scheme using pre-scanning and RSS prediction in visible light communication networks", EURASIP Journal on Wireless Communications and Networking, 2013.

Ogawa; "Article about VLC Guidance developed", Visible Light Communications Consotium (VLCC), Aug. 31, 2012.

Ogawa; "iPhone app from CASIO", Visible Light Communications Consotium (VLCC), Apr. 26, 2012.

Pacchloll, David; "Optical wireless may be the answer to dropped calls, and more", PennState University, Oct. 2, 2013.

Povey, Gordon, "VLC for Location, positioning and navigation", Jul. 27, 2011, http://visiblelightcomm.com/vlc-for-location-positioning-and-n . . . .

Spaarmann, Stefan; "Opportunities for a Sustainable Communications Technology". 2009.

Thanigavel, M.; "Li-Fi Technology in Wireless Communication", International Journal of Engineering Research & Technology (IJERT), ISSN: 2278-0181, vol. 2 Issue 10, Oct. 2013.

"Visible Light Communication", HWCommunications . . . Creating the next generation of solutions. Date of Download: Aug. 10, 2014. http://cyber.hwcomms.com/cyber/VLC.

"Visible Light Communication for Mobile Phones.mp4", YOUTUBE, Apr. 26, 2012.

Won, Eun Tae; "Visible Light Communication: Tutorial", Project: IEEE P802.15 Working Group for Wireless Personal Area Networks (WPANs), Mar. 9, 2008.

Zhang et al., Weizhi; "Asynchronous indoor positioning system based on visible light communications", Optical Engineering 53(4), 045105 (Apr. 2014).

PCT Application No. PCT/US2015/033613 International Search Report and Written Opinion mailed Sep. 1, 2015.

U.S. Appl. No. 14/732,533, John Cronin, Wireless Communication Driven by Object Tracking, filed Jun. 5, 2015.

U.S. Appl. No. 14/732,363, John Cronin, Managing Third Party Interactions With Venue Communications, filed Jun. 5, 2015.

U.S. Appl. No. 14/731,901, John Cronin, Managing Smart Tickets, filed Jun. 5, 2015.

U.S. Appl. No. 14/819,386, John Cronin, Disposable Connectable Wireless Communication Receiver, filed Aug. 5, 2015.

U.S. Appl. No. 14/732,553, Office Action mailed May 9, 2016.

U.S. Appl. No. 14/819,386, Final Office Action mailed Mar. 24, 2016.

U.S. Appl. No. 14/731,901 Office Action mailed Oct. 24, 2016.

U.S. Appl. No. 14/819,386, Office Action mailed Aug. 5, 2016.

U.S. Appl. No. 14/732,553, Final Office Action mailed Nov. 16, 2016.

\* cited by examiner

ZONE BASED WIRELESS PLAYER COMMUNICATIONS

CROSS-REFERENCE TO RELATED APPLICATIONS

The present application claims the priority benefit of U.S. provisional application No. 62/008,492 entitled "VLC Messages by Zones Coded for Players and Fans" and filed Jun. 5, 2014.

BACKGROUND OF THE INVENTION

Field of the Invention

The present invention generally relates to wireless and location based technologies. The present invention more specifically relates to communicating with players using a wireless system and zone based placement.

Description of the Related Art

Sideline or press box communication with players during a sporting event is known in the art. For example, the National Football League allows the quarterback and one defensive player from each team to have a radio installed in their helmet. This radio system facilitates sideline/press box communication with a player on the field who then relays plays or other information to their respective teammates. Such communication is currently limited to these two players on respective sides of the ball and in a one-to-one unicast fashion.

Rules notwithstanding, coaches cannot currently communicate with all or certain players on the field and affiliated with their team. For example, a secondary coach may wish to communicate a vulnerability in the line-up of wide receivers for the offense. In such an instance, broadcasting this information to every player—both offense and defense—on a publically available communication channel would allow the offense to recover from the vulnerability.

If the secondary coach were able to communicate only with the defense on a "defense only" communications channel, the linebacker corps is unlikely to be interested in the configuration of the secondary vis-à-vis the offense. In fact, this communication with the secondary may interfere with the linebackers otherwise attempting to address their own on the field needs with respect to the offense. Still further, there is the concern that an overzealous or obnoxious spectator could identify a particular radio frequency being used by a team and intercept or broadcast on the same.

There is a need in the art for improved wireless coach-to-player communications based on specific locales of players on the field.

SUMMARY OF THE CLAIMED INVENTION

In a first embodiment, a wireless coach-to-player communications based on specific locales of players on the field is claimed.

DETAILED DESCRIPTION

Embodiments of the present invention include a wireless coach-to-player communications system based on specific locales of players on the field. A combination of location based services and wireless access points and hubs tasked with communicating with particular players or particular zones where players are present (as determined through the use of location based services) is implemented as a part of the communications system. As a result of dedicating communication from certain access points and hubs to certain players or zones, coaches may communicate openly with some or all of their players in a particular region of the field. The system may also be used for targeted communications with fans and spectators attending a sporting event.

Figure 1:
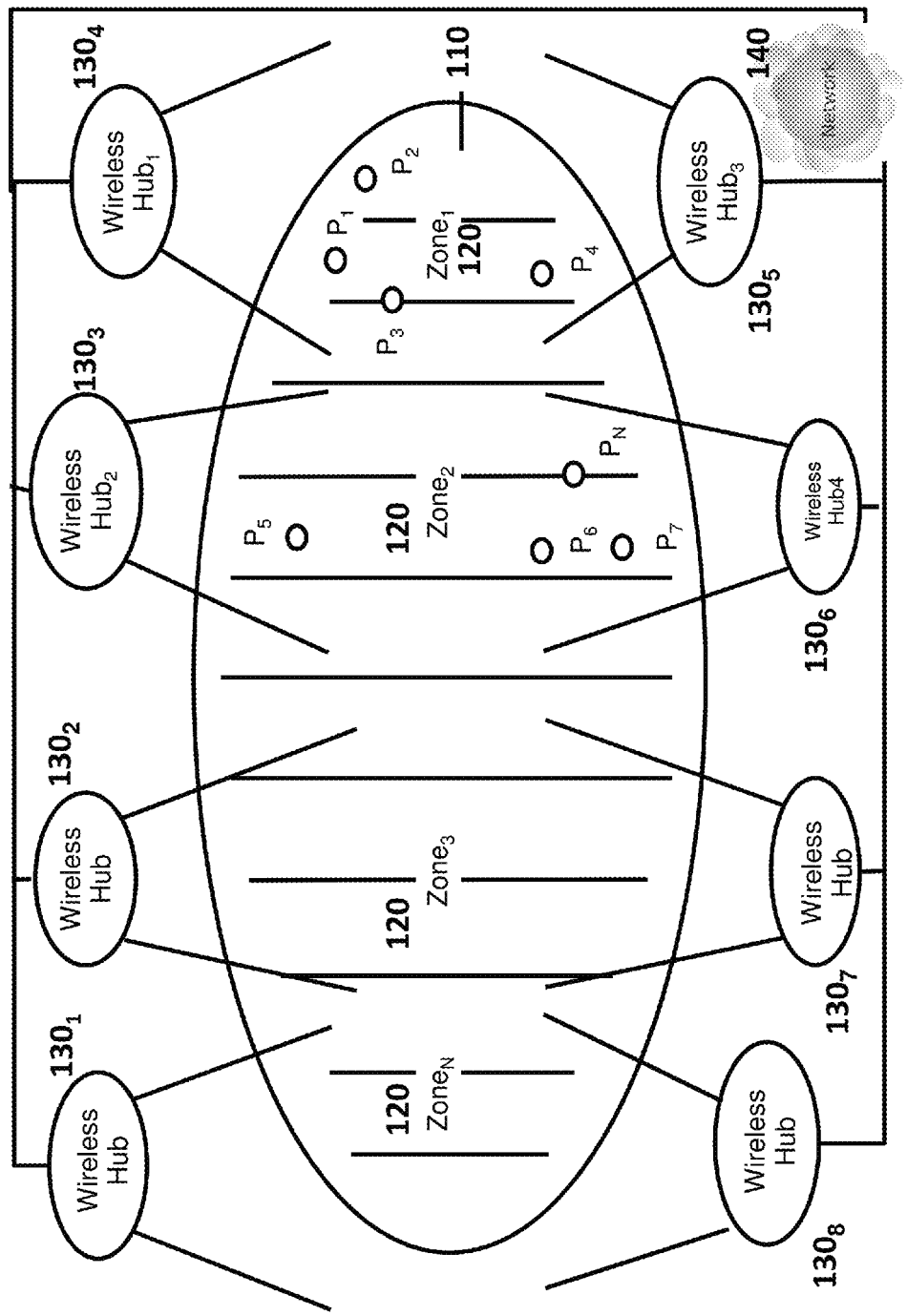
FIG. 1 illustrates a wireless coach-to-player communications system based on specific locales of players on the field.

FIG. 1 illustrates a wireless coach-to-player communications system based on specific locales of players on the field 100. The communications system 100 of FIG. 1 illustrates a football stadium 110 having a playing field divided into zones 120. Also illustrated in FIG. 1 are a series of wireless hubs or access points $130_{1...8}$. Each of the wireless hubs or access points $130_{1...8}$ are associated with a particular zone 120 of the stadium 110. As shown in FIG. 1, hub $130_4$ and $130_5$ are both operating in conjunction with Players 1-4 as a part of Zone 1 (120). Hub $130_3$ and $130_6$ create a second zone (120) that are associated with players 5, 6, 7, and N.

A National Football League stadium is utilized for the context of the presently disclosed invention. Notwithstanding, the wireless coach-to-player communications system 100 may be implemented in the context of any variety of entertainment or cultural events that are presented at a theater, gymnasium, stadium, or other facility to a group of attendees. Such events include but are not limited to sporting events such as football (both American and European), baseball, basketball, ice hockey, lacrosse, rugby, cricket, tennis, track and field, golf, cycling, horse racing, the Olympics, and motor sports such as automobile or motorcycle racing.

The wireless communication system 100 might also be implemented at concerts, music festivals, plays, or the opera. The present communications system 100 could also be scaled to religious events or permanent exhibitions such as a museum or historic locale.

With respect to wireless hubs or access points $130_{1...8}$, said hubs and access points are a part of wireless network 140. Examples of networks and protocols that may be used in the context of wireless network 140 include 802.11 wireless networks, Bluetooth networks, visible light communication (VLC) networks and bulbs, IrDA, Li-Fi, cellular, or RONJA. Specialized wireless access points and hubs may be used to further increase the accuracy and specificity of transmitted information including directional antennas in the context of 802.11 networks or section specific VLC bulbs in the case of a VLC network.

Figure 2:
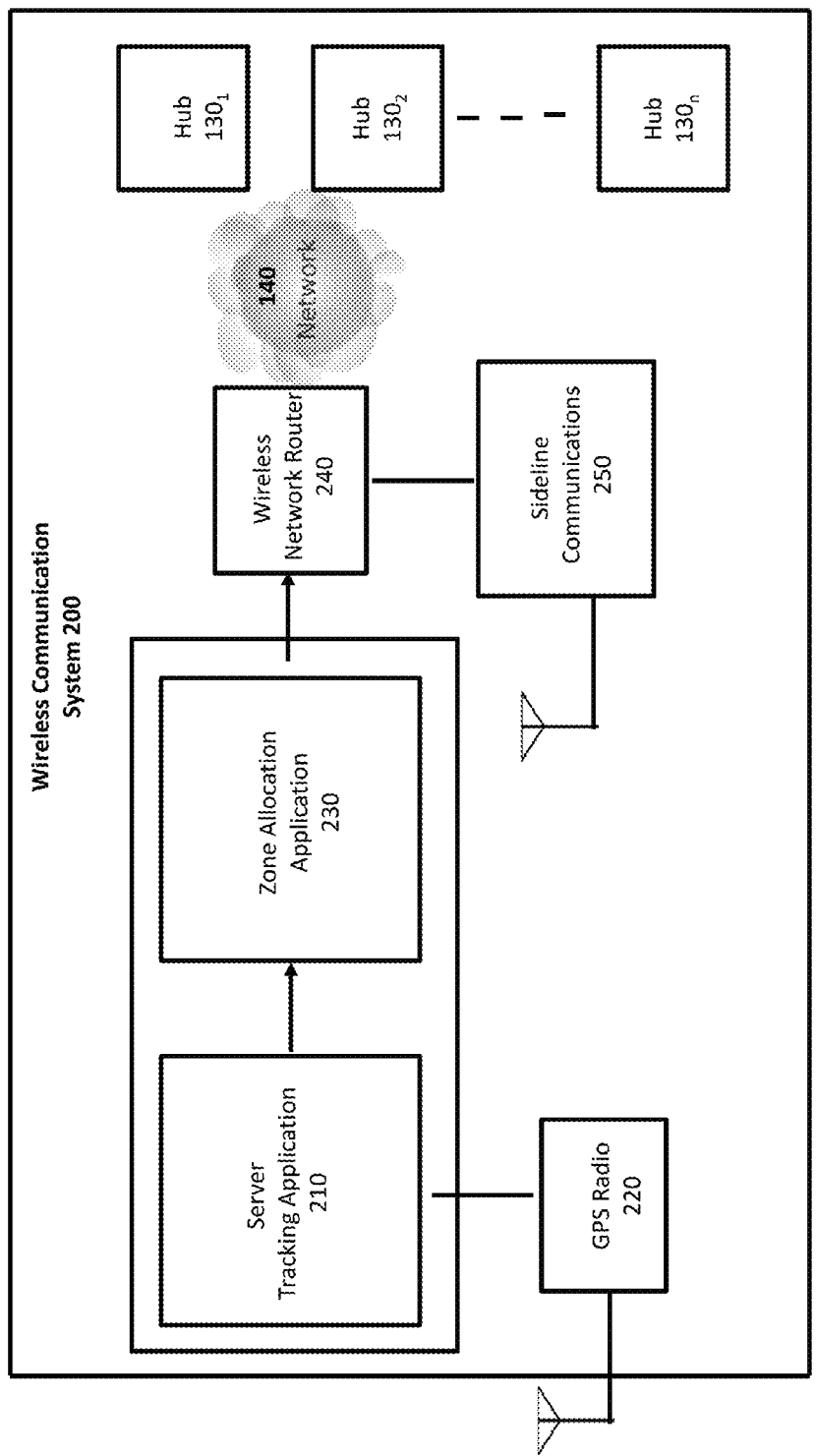
FIG. 2 illustrates a player tracking and zone allocation system to facilitate wireless coach-to-player communications.

FIG. 2 illustrates a player tracking and zone allocation system 200 to facilitate wireless coach-to-player communications. The wireless hubs or access points 130 of the communications system illustrated in FIG. 1 operate in conjunction with one or more location based services such as the global positioning system (GPS) radio system. GPS radio 220 identifies the location of various players (or alternatively, fans or attendees in the venue). The GPS radio system operates in accordance with the basic principles of the global positioning system concerning identification of the latitude and longitude of a player or other interested person with whom communication is desired.

The GPS radio 220 typically operates within a "worst case" pseudo-range accuracy of 7.8 meters. Various augmentation systems may be used in conjunction with the GPS radio system to improve the accuracy, availability, and timing of global positioning system information. In some instances, GPS accuracy has been reduced to a "worst case" of less than one meter.

For example, the GPS radio system normally relies solely on radio indicators from GPS units operating in conjunction with GPS satellites. GPS units may be integrated into equipment such as a wrist wearable or helmet like that shown in FIG. 3. By operating in conjunction with triangulation data from, for example, cellular base stations or beacon or address information that might be derived from specific wireless devices or wireless hubs or access points in a wireless network, the accuracy and time to first fix of the GPS radio system may be improved.

Returning to FIG. 2, latitudinal and longitudinal information generated by GPS radio system 220 and any augmentation devices or applications are assigned to individual players (and fans) and maintained by a tracking application 210 as shown in FIG. 2. Player tracking application 110 thus knows the real-time position of any player in a stadium or venue. Player tracking application 210 may then share this information with zone allocation application 230 to determine what player or players should be assigned to what zone based on currently available location based information of each player on the field (or fans in the stands or throughout the venue).

The zone allocation application 230 may then execute to allow for broadcast, multicast, or unicast of information (generally referenced as a transmission) to targeted parties at a stadium or venue by way of wireless network router 240. Those communications are further transmitted to the appropriate recipients in the appropriate zones by way of various wireless hubs or access points 130.

Such transmissions will include sideline based communications from the coaching staff through one or more radios operating in conjunction with the sideline communications radio hub 250. Various members of the coaching staff (e.g., head coach, linebackers coach, quarter backs coach, etc.) will utilize radio equipment communicatively coupled to the radio hub 250. The radio hub 250 will assign and manage particular radio channels or communications headers that correlate to particular players recipients. The router 240 will then distribute those messages in real-time to the appropriate wireless hubs 130 based on the determinations made through execution of the zone allocation application 230.

Real time wireless radio communications are but one example of sideline based communications. Communications can also be text based, voice over IP (VOIP), or image based. The type of communication is limited only to the type of end-user receiving device as might be implemented in the helmet or some other wearable of a player like that illustrated in FIG. 3. In the case of a venue seeking to communicate with fans or stadium attendees, the same principles described in FIG. 2 are implemented although the system directs communications to a mobile application executing on a user mobile device or other communication device at the seat of the attendee. This information may include special offers for food and concessions, statistics, information about the venue, or replays.

Wireless network router 240 of FIG. 2 receives information generated by the player tracking application 210, GPS radio system 220, zone allocation application 230, and sideline communications radio hub 250. Wireless network router 240 then broadcasts, multicasts, or unicasts that information to individual wireless network hubs or access points 130 within the stadium or venue. Wireless network router 240 may address certain information to only certain hubs or access points within the venue in accordance with channel or messaging limitations identified by the radio hub 250. Wireless access points and hubs 130 then relay information to particular zones and players in those zones as described in the context of FIG. 1.

Figure 3:
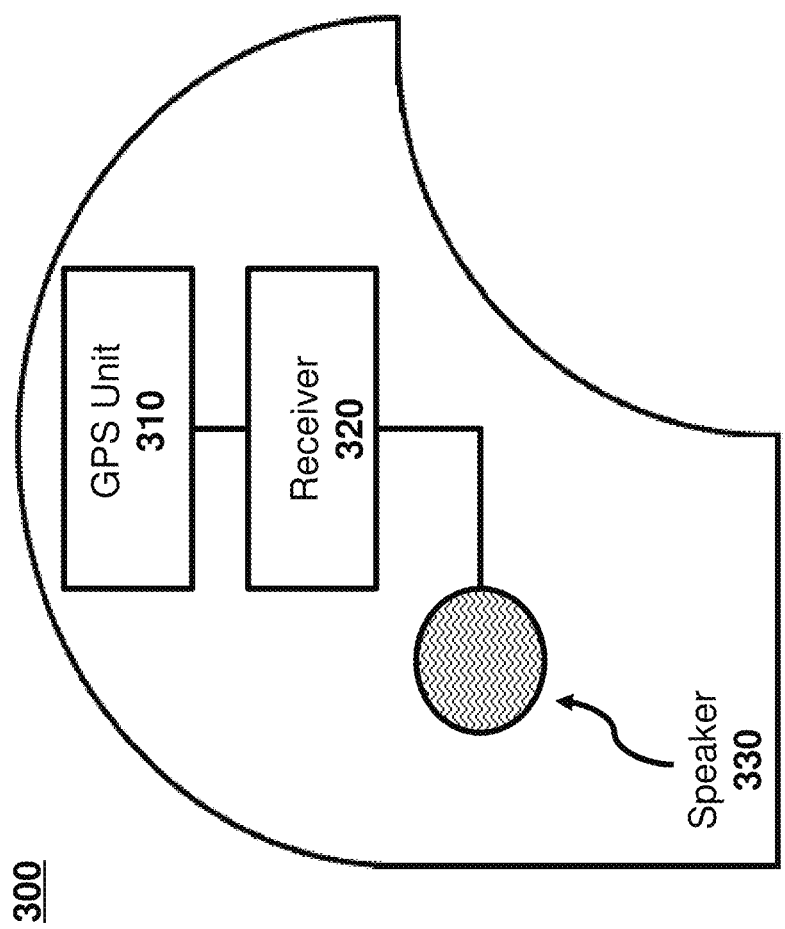
FIG. 3 illustrates an exemplary piece of player equipment including location based tracking and radio componentry.

FIG. 3 illustrates an exemplary piece of player equipment 300 including location based tracking 310 and radio componentry 320, 330. Specifically, FIG. 3 illustrates a player helmet 300. The helmet 300 includes a GPS tracking device 310 that provides information to the GPS radio system 220 of FIG. 2. Player helmet 300 of FIG. 3 also includes a radio receiver 320 that receives radio transmission from coaches and sideline personnel based on zone allocations as facilitated by the system described in FIG. 2. Transmissions of information are played through speaker 330.

It should be noted that helmet 300 is exemplary in its disclosure of a GPS chip 310 and radio receiver 320. Other components may be introduced including other radio communications formats including but not limited to visual or text based communications as might occur through a heads up display that might be integrated into a helmet visor (not shown).

The components of the system illustrated and described in FIGS. 1 and 2 are those typically found in computer systems and are intended to represent a broad category of such computer components that are well known in the art. Thus, the system 100 of FIG. 1 and 200 of FIG. 2 can be implemented using different hardware configurations, networked platforms, and multi-processor platforms. Various operating systems may likewise be used. Applications may constitute executable instructions maintained in a non-transitory computer readable storage medium such as main memory or random access memory that are executed by a processing device.

The foregoing detailed description has been presented solely for the purposes of illustration and description. It is not intended to be exhaustive or limiting. Modifications and variations are possible in light of the above teachings. The described embodiments were chosen to best explain the principles of the invention and its practical application as to allow others skilled in the art to best practice the invention and embodiments thereof. The scope of the present invention is to be limited solely by the following claims subject to proper construction of the same.

What is claimed is:

1. A method for providing location-based communication, the method comprising:
  receiving location information identifying locations of a plurality of recipient devices within a venue divided into a plurality of zones, wherein each zone is specific to a wireless transmitter in the venue that transmits into the respective zone;
  receiving a message and an indication regarding a target from the plurality of recipient devices;
  executing instructions stored in memory, wherein execution of the instructions by the processor:
    identifies, based on the location information, in which of the plurality of zones the target is located, and
    routes the message to a wireless transmitter identified as corresponding to the identified zone where the target is located; and
  transmitting the message to the target in the identified zone via the identified wireless transmitter that corresponds to the identified zone.

2. The method of claim 1, further comprising transmitting the message to one or more other recipient devices identified as one or more secondary targets, wherein execution of the instructions by the processor:
  identifies, based on the location information, in which of the plurality of zones each of the secondary targets is located, and
  identifies that the secondary targets are located in the same identified zone as the target.

3. The method of claim 1, wherein the location information is generated using a plurality of global positioning system tracking devices associated with the plurality of recipient devices.

4. The method of claim 1, wherein transmitting the message to the target via the identified wireless transmitter includes transmitting the message via a radio channel that correlates to the target.

5. The method of claim 1, wherein transmitting the message to the target via the identified wireless transmitter includes transmitting the message using a communication header that correlates to the target.

6. The method of claim 1, further comprising:
  identifying, based on updated location information, that the target is now located in a different zone; and
  transmitting the message to the target via a wireless transmitter corresponding to the different zone.

7. The method of claim 1, wherein the venue is a sports venue.

8. The method of claim 1, wherein each wireless transmitter of the plurality of wireless transmitters is configured to transmit into a different zone of the plurality of zones.

9. A system for providing location-based communication, the system comprising:
  a communication interface that communicates over a communication network, wherein the communication interface receives location information identifying locations of a plurality of recipient devices within a venue divided into a plurality of zones, wherein each zone is specific to a wireless transmitter in the venue that transmits into the respective zone;
  an input interface to receive a message and an indication regarding a target from the plurality of recipient devices; and
  a processor, wherein execution of the instructions by the processor causes the system to:
    identify, based on the location information, in which of the plurality of zones the target is located, and
    route the message to a wireless transmitter identified as corresponding to the identified zone where the target is located, wherein the identified wireless transmitter transmits the message to the target in the identified zone.

10. The system of claim 9, wherein the identified wireless transmitter transmits the message to one or more other recipient devices identified as secondary targets, wherein execution of the instructions by the processor causes the system to:
  identify, based on the location information, in which of the plurality of zones each of secondary targets is located, and
  identify that the secondary targets are located in the same identified zone as the target.

11. The system of claim 9, wherein the location information is generated using a plurality of global positioning system tracking devices coupled to the plurality of recipient devices.

12. The system of claim 9, wherein the identified wireless transmitter transmits the message to the target in the identified zone via a first radio channel that correlates to the target.

13. The system of claim 9, wherein the identified wireless transmitter transmits the message to the target in the identified zone using a first communication header that correlates to the target.

14. The system of claim 9, wherein the processor executes further instructions to identify, based on updated location information, that the target is now located in a different zone, and to initiate transmission of the message to the target via a wireless transmitter corresponding to the different zone.

15. The system of claim 9, wherein the venue is a sports venue.

16. A non-transitory computer-readable storage medium having embodied thereon a program executable by a processor to perform a method for providing location-based communication, the method comprising:
  receiving location information identifying locations of a plurality of recipient devices within a venue divided into a plurality of zones, wherein each zone is specific to a wireless transmitter in the venue that transmits into the respective zone;
  receiving a message and an indication regarding a target from the plurality of recipient devices;
  identifying, based on the location information, in which of the plurality of zones the target is located;
  routing the message to a wireless transmitter identified as corresponding to the identified zone where the target is located; and
  transmitting the message to the target via the identified wireless transmitter corresponding to the identified zone.

17. The non-transitory computer-readable storage medium of claim 16, further comprising additional instructions executable to transmit the message to one or more other recipient devices identified as secondary targets, wherein execution of the additional instructions by the processor:
  identifies, based on the location information, in which of the plurality of zones each of the secondary targets is located,
  identifies that the secondary targets are located in the same identified zone as the target.

18. The non-transitory computer-readable storage medium of claim 16, wherein the location information is generated using a plurality of global positioning system tracking devices coupled to the plurality of recipient devices.

19. The non-transitory computer-readable storage medium of claim 16, wherein transmitting the message to the target via the identified wireless transmitter includes transmitting the message using one of a first radio channel that correlates to the target or a first communication header that correlates to the target.

20. The non-transitory computer-readable storage medium of claim 16, further comprising additional instructions executable to:
  identify, based on updated location information, that the target is now located in a different zone; and
  route the message to the target to a wireless transmitter identified as corresponding to the different zone.

* * * * *